Figure 3:
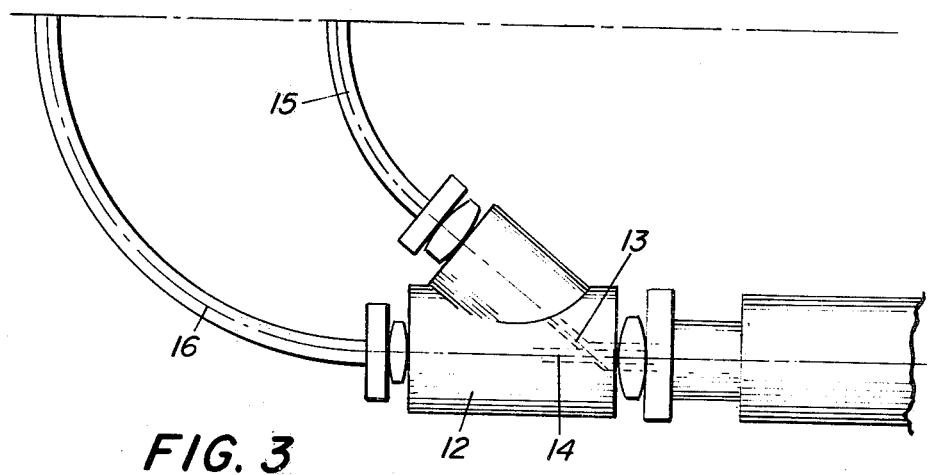
Figure 3A:
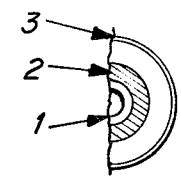

United States Patent [19]

Dal Bianco

[11] 4,177,240
[45] Dec. 4, 1979

[54] TUBULAR REACTOR FOR THE HIGH PRESSURE POLYMERIZATION OF ALPHA-OLEFINES

[75] Inventor: Alberto Dal Bianco, Ferrara, Italy

[73] Assignee: Montedison S.p.A., Milan, Italy

[21] Appl. No.: 814,169

[22] Filed: Jul. 8, 1977

[30] Foreign Application Priority Data

Jul. 12, 1976 [IT] Italy ................................ 25228 A/76

[51] Int. Cl.$^2$ ............................................. B01J 3/04
[52] U.S. Cl. .................................... 422/115; 422/134; 422/138; 422/202; 422/234; 422/109
[58] Field of Search ............... 23/289, 252 R; 526/64, 526/65, 73; 165/140, 141; 422/134, 138, 202, 234, 242, 114, 115, 109

[56] References Cited

U.S. PATENT DOCUMENTS

| | | | |
|---|---|---|---|
| 1,812,341 | 6/1931 | Jaeger | 422/202 |
| 1,826,548 | 10/1931 | Jaeger | 422/202 |
| 2,363,738 | 11/1944 | Mather et al. | 422/109 |
| 2,769,804 | 11/1956 | Hanson | 526/65 |
| 3,305,600 | 2/1967 | Hopper et al. | 23/252 R X |
| 3,458,467 | 7/1969 | Herrle et al. | 526/64 X |
| 3,492,047 | 1/1970 | Moles et al. | 422/202 |

Primary Examiner—Michael S. Marcus
Attorney, Agent, or Firm—Morgan, Finnegan, Pine, Foley & Lee

[57] ABSTRACT

The present invention concerns a reactor of the tubular type, with a high heat exchange, for the catalytic production under high pressure of alpha-olefine polymers and copolymers, in particular polymers and copolymers of ethylene.

More particularly, the tubular reactor of this invention consists of three coaxially arranged tubes, distanced from each other in such a way as to create between the outer tube and the intermediate an annular interspace suited for the circulation of the refrigerating fluid and between the intermediate tube, sized for very high pressures, and the innermost tube an interspace that will form the exothermic reaction zone proper, said innermost tube being of the low-pressure type and forming the preheating zone of the process fluid, fed in under pressure from the outside by the action of the reaction heat that develops inside said intermediate tube, said preheating zone extending up to over half the length of the reactor and, at the end of it, defining the reaction starting zone that is the feeding zone of the catalyst or the like, means for the control of the temperature in said reaction starting zone through the immission of fresh process fluid into the reaction starting zone itself, said process fluid having been drawn from the inlet of the reactor or, by the recycling, into the inlet of the reactor, of process fluid drawn from the end of the preheating zone and refrigerated, as well as means for balancing the pressures between said reaction zone and said preheating zone.

6 Claims, 5 Drawing Figures

TUBULAR REACTOR FOR THE HIGH PRESSURE POLYMERIZATION OF ALPHA-OLEFINES

BACKGROUND OF THE INVENTION

As is known, the most diffused technique for obtaining ethylene polymers or ethylene-based copolymers consists in passing the reactants through a reactor-container fitted optionally with a stirrer, or through a tubular reactor or also through reactors consisting of a combination of both, at pressures in general greater than 500 atm. and at temperatures comprised between 100° and 400° C., by using as initiator agents of the reaction substances generating free radicals under operational conditions or using other types of catalysts suited for producing ethylene polymers or copolymers.

In general, the tubular reactors used in the polymerization of ethylene consist of a high-pressure tube closed into a sleeve; through the annular interspace between sleeve and tube there flows a cooling fluid along the reaction zone in order to allow a heat exchange towards the outside inasmuch of this type of reaction is intensely exothermic, while it is heating in the preheating and starting zone.

In fact, the known tubular reactors are subdivided into different sections, depending on their length, the length being equal to many times the diameter of the high pressure tube, for instance, from 250 to 40,000 times. More particularly, these tubular reactors have always a zone for the preheating of the ethylene, this zone extending up to the point where the exothermic reaction is started, and a heat subtraction zone generally corresponding to the reaction zone which absorbs part of the heat developed by the reaction thereby hindering the formation of hot points where there may set in the decomposition reaction of the ethylene. A portion of heat is removed through the walls of the tube by the refrigerating fluid circulating in the outside sleeve, while the remaining part of the reactions heat is absorbed by the reaction mixture (ethylene that had not reacted and polymer), wherefore the temperature of the mixture itself tends always to rise.

The heat that develops is, in fact, hindered to flow outside because of the great thickness of the walls of the reactor that has to stand very high pressures, up to 2,000 atm. and more, developed not only by the reaction but also due to the effect of anomalous reactions of the ethylene such as for instance the thermal decomposition of the reactants due to the particularly high temperature.

Since it is therefore necessary to limit the temperature of the ethylene for the above-mentioned reasons, it follows that the maximum yield of the exothermic reaction is thus limited.

Various different methods have been suggested and used for the removal of the reaction heat. Of these, the most widely used consists in an intermediate feeding of fresh ethylene which must, however, be suitably proportioned so as not to reduce the reaction temperature to such an extent as to cause the interruption of the reaction itself.

Moreover, there still remains the problem of supplying all the preheating and starting heat that must be fed to the reactant at very high temperature because of the difficulty to have a proper heat exchange. There must also be kept in mind that both the heating as well as the cooling, for certain types of polymer, must always be achieved through the walls of the tubular reactor, inasmuch as the method of feeding in fresh gas provokes modifications in the quality of the type of polymer.

In any event, since the great thickness of the tube, as already explained, reduces the global coefficient of the thermal exchange, for instance, also by three times or more, it follows that whatever the refrigerating fluid used and whatever the geometry of the outside surface of the high-pressure tube, the result will change little with reference to the effects of the modification of the coefficient of global exchange.

OBJECTS OF THE INVENTION

The main object of this invention is to provide an improved tubular reactor which avoids the earlier-mentioned drawbacks of prior tubular reactors involving subtraction of heat in the reaction zone and which at the same time facilitates the operation for the supply of heat in the preheating zone.

GENERAL DESCRIPTION OF THE INVENTION

The object of this invention is attained by carrying out, according to this invention, a tubular reactor which will have the heating zone inside the reaction zone, that is, by disposing a low-pressure tube inside the reaction tube. In this way, several advantages are achieved, as will appear more clearly further on, and which may be briefly described as follows: elimination of the preheating zone and of the corresponding heating installations; considerable reduction of the length of the reactor and corresponding increase of the thermal exchange surface and, at last, a greater yield in polymer or copolymer.

More particularly, this object and said advantages are achieved in practice with a high thermal exchange tubular reactor for the catalytic production under high pressure of alpha-olefin polymers and copolymers. For the purpose of illustration, reference will be made hereinafter to the production of ethylene polymer from ethylene. The reactor consists of three coaxial tubes arranged in distanced positions inside each other so as to create between the outer tube and the intermediate one an annular interspace for the circulation of the refrigerating liquid; between the intermediate tube, dimensioned for very high pressures, and the inner tube, an interspace forming the exothermic reaction zone proper, said inner tube, of the low-pressure type, forming the preheating zone for the process fluid (e.g., ethylene) fed into it under pressure from the exterior, by the action of the reaction heat that develops inside said intermediate tube, said preheating zone extending for more than half the length of the reactor and defining, at the end of it, the reaction starting zone, that is the zone of the immission of the catalyst or the like. Means are provided for controlling the temperature of said reaction starting zone by the introduction, into the starting zone itself, of fresh process fluid drawn from the inlet of the reactor or by the recycling, at the inlet of the reactor, of process fluid drawn at the end of the preheating zone and refrigerated, as well as means for equalizing the pressure between said reaction zone and said preheating zone.

More particularly, said three-coaxial-tube reactor is spiral shaped and develops along a vertical axis, and foresees at all bends separate and refrigerated pipes for the flows of fresh process fluid (e.g., ethylene), and of the process fluid with polymer or copolymer, in order to compensate for the differences of thermal expansion of the bents or curves themselves.

SPECIFIC DESCRIPTION OF THE INVENTION

Figure 1:
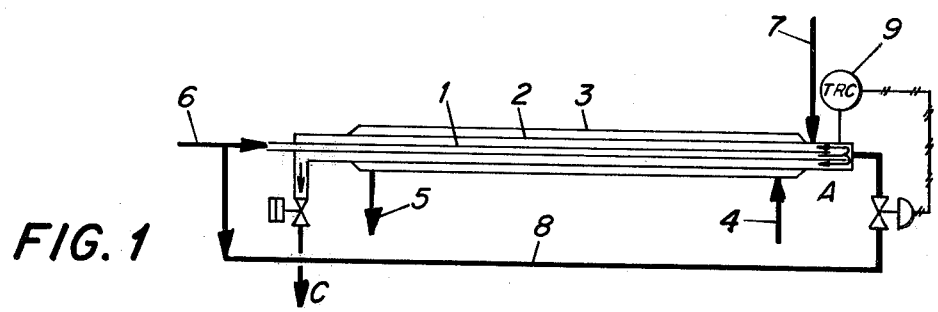
Figure 2:
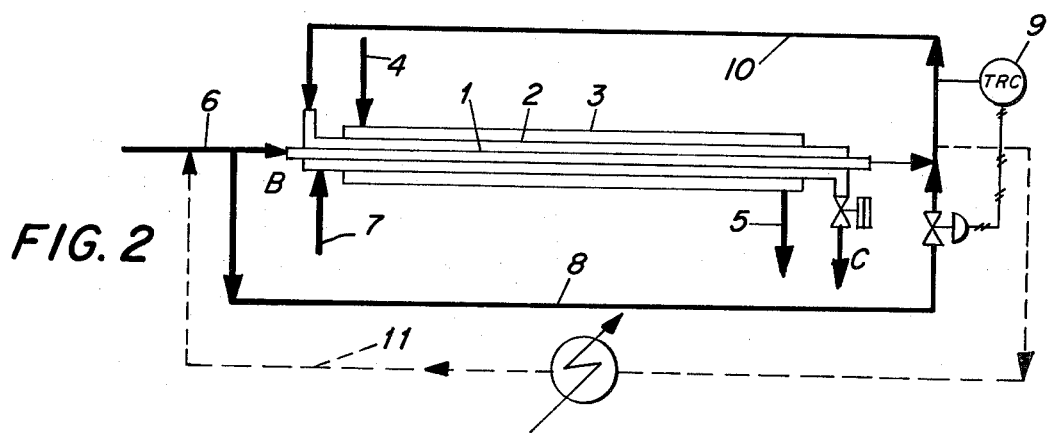

The invention will now be described in more detail, according to a preferred but not limiting form of embodiment, by reference to the attached drawing given for purely illustrative and not limiting purposes, and wherein:

FIG. 1 shows in a schematical way a tubular reactor with three coaxial tubes according to the invention, in a rectilinear shape for the sake of simplicity in interpretation;

FIG. 2 still in a schematical way shows a variant of the three-coaxial-tube reactor illustrated in FIG. 1; and FIG. 3 shows schematically a type of a separate-pipe tube connection usable according to the invention in the curves of the tubular spiral reactor.

Figure 4:
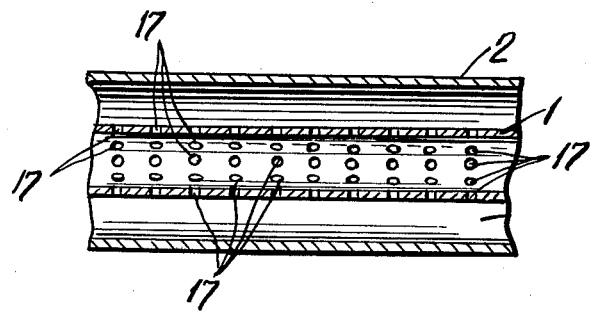

FIG. 4 shows the perforations of the innermost tube of the reactor which are in open communication with the intermediate tube of the reactor.

As already stated, the tubular reactor object of this invention is a particular type of reactor, improved with respect to the conventional ones which consist of a lined high-pressure tube, with a length of several hundred meters and arranged in a spiral or the like.

As is shown by FIG. 1, the reactor object of this invention consists of tubes 1, 2 and 3, in a coaxial arrangement to each other and so distanced from each other as to create annular interspaces of constant cross-section between them; in the outer tube 3 is made to circulate the refrigerating fluid which is fed in through inlet 4 and flows out through discharge 5. The intermediate tube 2 is the only one sized for very high pressures, inasmuch as in this tube there takes place the exothermic reaction. Into the innermost tube 1, sized for the low pressures, is fed in the process fluid, that is the fresh ethylene. This latter flows in through end 6 of the tube, at a temperature in general ranging from 35° to 100° C. and under very high pressure, more than 2000 atm.

The innermost tube 1 has a length which is slightly greater than the half of that of reaction tube 2; at the end of the tube 1 there is the zone A for the starting of the reaction.

Into the reaction zone A (FIG. 1) the catalyst is fed in through inlet 7 while the temperature is controlled by a part of ethylene drawn at the inlet of the reactor and diverted through conduit 8 to zone A, the exact starting temperature being kept under control by a standard temperature measuring-recording apparatus (TRC) as indicated by 9 in FIG. 1. In tube 1 the process fluid is thus preheated by the heat developed in counter current by the reaction that takes place in the intermediate tube 2.

FIG. 2 represents a variant of reactor of FIG. 1; in this solution the preheating tube 1 protrudes from intermediate reaction tube 2; the preheated ethylene is conveyed through the suitably insulated conduit 10 to the head or inlet of the reactor, at point B. Point B forms in this case the reaction starting zone. Control device 9 for the control of the temperature is placed immediately after the outlet of the preheating tube; the temperature may also be controlled by the drawing of gases at the end of the preheating and by the subsequent recycling of these, through conduit 11 (FIG. 2), to the starting point of preheating, after an intermediate cooling down. It is a question of balancing the flow rate of the two tubes in such a way as to get in the catalyst inlet zone (A and B) the desired starting temperature and to subtract the greatest amount of reaction heat without, however, refrigerating to a point where no starting can take place anymore.

In the solution of FIG. 2, therefore, the preheating by means of the reaction heat occurs in equicurrent.

The tubular reactor of this invention is based on the fact that a low-pressure tube is slipped into a high pressure tube and that the flow rate inside the low-pressure tube, which has a low thickness, must be about equal to the flow rate passing through the annular zone comprised between said two tubes (1 and 2), and that it is adjustable.

In both embodiments of FIG. 1 and FIG. 2 the reaction is primed or started in a position (zone A and zone B of said figures) that is located in the second half of the reactor, that is, in the point where the catalyst is fed in, and not before, inasmuch as during the preheating of the process fluid there may be formed undesirable reaction starting points with the consequences of such a case.

In both figures by C is indicated the point of discharge of the reaction product (ethylene+polymer) from the reactor.

In the case of countercurrent (FIG. 1) this position corresponds to the backflow of the ethylene current (point A in FIG. 1).

In the case of equicurrent (FIG. 2), this position is located at the beginning of the reactor (point B of FIG. 2). In points A and B the temperature is controlled, as previously indicated, with part of the ethylene diverted from the inlet of the reactor, in order to get the exact starting temperature, that is with one part of the ethylene-recycled to the inlet of the reactor and drawn from the end of the preheating zone and refrigerated.

The reaction is thus controlled by a number of parameters greater than that controls the known processes which are dependent on the location of the starting zone in order to exploit at the maximum the reactor. Moreover, in the known reactors it is difficult to determine the right position of the point of inlet of the fresh ethylene serving for the cooling of the reaction through mixing. All this does not happen in the reactor according to the invention, since the point of the start of the reaction is well localized.

The process fluid is thus heated by the heat developed by the reaction, thereby allowing one to eliminate the preheating and starting zone of the known reactors as well as the corresponding high temperature circuit. This means a considerable saving in energy as well as in installation cost.

Thus, disposing of a surface that is considerably greater, in comparison with a traditional reactor having a high pressure tube of equal inside diameter, and since the global heat exchange coefficient on the average is increased too, it is possible to get rid of more heat and, thus, favoring the exothermic polymerization reaction, to increase the yield.

In order to restrict the over-all size of the reactor of this invention, it is built like the present-day spiral reactors and the problem of the differences of expansion in the curves is overcome by separating the flows (fresh ethylene and ethylene with polymer) in the way indicated in FIG. 3.

In that figure, in fact, a two-way fitting 12 is connected to the end of the two innermost coaxial tubes which are deviated, or better still separated from each other in the curve as indicated by 13 and 14.

The inner tube 1 is then connected with a bent tube 16 while the intermediate tube 2 is connected with another tube 15 similarly bent. These two separate conduits are then connected in the same way with one single similar fitting 12, after the by-passing of the curve, and connected to the corresponding inner and intermediate tubes of the adjacent trunk of coaxial tubes.

These tubes separated in the curved zones must always be provided with a lining and coolant, so as to be able to subtract heat.

In order to even better demonstrate the particular economical and practical advantages offered by the tubular reactor device of this invention, there will now be given two examples for comparison of catalytic reaction of the ethylene carried out under the same operational conditions (initial flow rate, temperature and pressure of the ethylene, and production of the polymer). Example 1 uses a conventional spiral reactor, while Example 2 uses a coaxial tube reactor of this invention.

EXAMPLE 1

For this test there was used a tubular reactor of traditional shape, with a length of 1850 ft. (corresponding to 564 m), and having an inside diameter of 1 ¼ inch., corresponding to 3.20 cm. The tube is made for all its length of such a material and with such a thickness as to resist to the very high pressure of the reaction, and is lined in such a way as to create the necessary interspace for the circulation of the refrigerating liquid (in the reaction zone) and for the heating fluid in the preheating starting zone.

It was decided to produce 4300 kg/hr of ethylene polymer with a feeding rate of 20 t/hr of ethylene at 65° C. and under a pressure at the reactor inlet of 2450 atm.; the mean specific heat of the ethylene under reaction conditions was assumed to be 0.5 Kcal/kg°C.

The ethylene was preheated within the first 850 ft (corresponding to 260 m) up to a temperature of 180° C. by means of a diathermic fluid at 230° C.

Under these conditions, the calories necessary for the preheating are given by the following equation:

$$0.5 \times 20,000 \times 115° \text{ C.} = 1.150.000 \text{ Kcal/h},$$

wherein 0.5 corresponds to the mean specific heat of the ethylene (Kcal/kg°C.);
20,000 is the feeding rate in kg/hr;
115° C. is the difference between 180° C. (final preheating temperature) and 65° C. (temperature of the ethylene at the inlet).

As a catalyst was used oxygen, while the refrigerating fluid, in the reaction zone corresponding to the remaining 1000 ft (equal to 304 m) of the high-pressure tube, was at a temperature of 125° C.

The ethylene and the polymer thus come out of the reactor at a temperature of 250° C., while the yield of the installation amounts to 21.5%; in fact:

$$\frac{4300 \text{ kg of product}}{20,000 \text{ kg of fed in ethylene}} \times 100 = 21.5\%$$

Considering 0.55 Kcal/kg°C. as the mean specific heat of the mixture (polymer+ethylene) the heat absorbed by the mixture will be:

$$0.55.(250° \text{ C.}-180° \text{ C.}) \times 20,000 = 770,000 \text{ Kcal/hr},$$

while the heat developed by the reaction (within the 1000 ft equal to 304 m) will be:

$$805 \times 4300 \text{ kg/hr} \simeq 3,470,000 \text{ Kcal/hr},$$

wherein by 805 Kcal/kg is meant the reaction heat developed in the formation of 1 kg of polymer under reaction conditions. Thus, from the refrigerating fluid there had to be removed these calories less those absorbed by the mixture, that is:

$$3,470,000 - 770,000 = 2,700,000 \text{ Kcal/hr}.$$

Thus, operating in a traditional reactor under the conditions herein above described, one obtains a yield of 21.5%, an output of 4.300 kg/hr of polymer and the substraction of an amount of reaction heat equal to 2,700,000 Kcal/hr.

EXAMPLE 2

Operating under the same conditions (of initial flow rate, of production and of preheating and starting heat), but in a coaxial tubular reactor according to the invention, having a preheating tube with a diameter of ¾" (equal to 1.9 cm) inserted in the 1000 ft of the high-pressure tube, the preheating and starting calories (1,150,000 Kcal/hr) will be supplied directly by the reaction heat; these calories removed from the inside of the reactor lead to an increase of the amount of polymer produced which is equal to 1430 kg/hr.

In fact:

$$\frac{1,150,000}{805} = 1430 \text{ kg/hr of polymer}$$

Thus the total quantity of product in this instance will be:

$$4300 + 1430 = 5730 \text{ kg/hr}.$$

Therefore, the yield will be:

$$\frac{5730}{20,000} \times 100 = 28.65\%$$

This increase of yield will mean that the same quantity of polymer (4300 kg/hr) may be obtained by reducing the flow rate of the ethylene feed from 20,000 kg/hr to about 15,000 kg/hr.

The flow speed of the reactants, by reducing the cross-section for the installation to the preheating tube, is thus increased and similarly are increased the load losses. In order to equalize the pressures between the inner tube, and the middle high pressure tube 2 there have, thus, been made a series of holes 17 to put into communication the sections at different pressures; this has allowed to increase the flow speed in the tubes to the detriment of the load losses and to emphasize thus the turbulence that helps to eliminate the veil or thin film of polymer that may possibly deposit itself into the tube walls with a favorable result for the thermal exchange and, thus for the yield.

From a direct comparison of Examples 1 and 2 with each other, it appears quite evident that with a coaxial tubular reactor of this invention (Example 2), it is possible to achieve the following advantages:

Elimination of the preheating and reaction starting zone, as well as of the corresponding installations and heating circuits;

Increase of the thermal exchange surface and, thus, a reduction of the over-all length of the reactor;

Increase of the total thermal exchange coefficient, with a consequential greater removal of heat and thus, with a greater yield in polymer, and last but not least;

An exact localization of the starting point of the reaction with the consequential maximum exploitation of the reactor.

Obviously, in practice, in this above-described invention, there may be introduced modifications and variants of an equivalent structural and functional character, outside of thereby falling without the protective scope of the invention itself.

What we claim is:

1. A tubular high thermal exchange reactor for the catalyzed production of alpha-olefine polymers and copolymers thereof from process fluid alpha-olefines under high pressure, which comprises three coaxially-arranged spaced-apart tubes consisting of:
   (1) innermost tube means comprising a tube having an inlet opening at one end for the entry of said alpha-olefine process fluid and an outlet opening at the other end for the emission of said alpha-olefine process fluid, said innermost tube having perforations in the walls thereof in open communication with
   (2) intermediate tube means comprising a tubular wall and an upstream end wall and a downstream end wall with an opening therein for said innermost tube, said tube and said end walls encompassing the entire perforated area of said innermost tube, the walls of said intermediate tube being adapted to withstand high reaction pressures and which define an annular interspace with the walls of said innermost tube for the passage therethrough of said alpha-olefine process fluid, said outlet opening of said innermost tube terminating adjacent but spaced apart from the upstream end wall of said intermediate tube thereby forming the inlet means of said intermediate tube for receiving said alpha-olefine process fluid directly from said outlet opening of said innermost tube and having separate inlet means for entry of a polymerization catalyst for said alpha-olefine near the inlet means for said alpha-olefine process fluid and an outlet opening for alpha-olefine polymer or copolymer fluid at said downstream end wall,
   (3) heat exchange means comprised of an outermost tube having a tubular wall and end walls, the walls defining an annular interspace with the walls of said intermediate tube means for the passage therethrough of a refrigerating fluid, and
   (4) conduit means for diverting alpha-olefine process fluid externally between said innermost tube process fluid inlet and said innermost tube process fluid outlet.

2. The reactor of claim 1 wherein said coaxially-arranged tubes are in the shape of a spiral.

3. The reactor of claim 2 wherein in the bends of said spiral there are provided curved conduit means corresponding to said innermost and intermediate tubes, for the separate passage therethrough of alpha-olefine process fluid and fluid comprising alpha-olefine polymer or copolymer, said conduit means having cooling means for compensating for the thermal expansion of the walls of said conduits.

4. A tubular high thermal exchange reactor for the catalyzed production of alpha-olefine polymers and copolymers thereof from process fluid alpha-olefines under high pressure, which comprises three coaxially-arranged spaced-apart tubes consisting of:
   (1) innermost tube means comprising a tube having an inlet opening at one end for the entry of said alpha-olefine process fluid and an outlet opening at the other end for the emission of said alpha-olefine process fluid, said innermost tube having perforations in the walls thereof in open communication with
   (2) intermediate tube means comprising a tubular wall and an upstream end wall and a downstream end wall encompassing the entire perforated area of said innermost tube, said innermost tube extending through and beyond the end walls of said intermediate tube means, the walls of said intermediate tube means being adapted to withstand high reaction pressures and which define an annular interspace with the walls of said innermost tube for the passage therethrough of said alpha-olefine process fluid, said intermediate tube having inlet means at one end for receiving said alpha-olefine process fluid indirectly from said outlet opening of the innermost tube through insulated conduit means forming a connection therebetween, said intermediate tube also having inlet means for entry of a polymerization catalyst for said alpha-olefine near the inlet means for said alpha-olefine process fluid and an outlet opening for said alpha-olefine polymer or copolymer fluid at said downstream end wall,
   (3) heat exchange means comprised of an outermost tube having a tubular wall and end walls, the walls defining an annular interspace with the walls of said intermediate tube means for the passage therethrough of a refrigerating fluid, and
   (4) conduit means for diverting alpha-olefine process fluid externally between said innermost tube process fluid inlet and said innermost tube process fluid outlet, 5. The reactor of claim 8 wherein said coaxially-arranged tubes are in the shape of a spiral.

6. The reactor of claim 5 wherein in the bends of said spiral there are provided curved conduit means corresponding to said innermost and intermediate tubes, for the separate passage therethrough of alpha-olefine process fluid and fluid comprising alpha-olefine polymer or copolymer, said conduit means having cooling means for compensating for the thermal expansion of the walls of said conduits.

* * * * *

UNITED STATES PATENT AND TRADEMARK OFFICE
CERTIFICATE OF CORRECTION

PATENT NO. : 4,177,240
DATED : December 4, 1979
INVENTOR(S) : Alberto DalBianco

It is certified that error appears in the above—identified patent and that said Letters Patent are hereby corrected as shown below:

In Col. 8, line 47, "8" should correctly read -- 4 --.

Signed and Sealed this

Twenty-ninth Day of April 1980

[SEAL]

Attest:

SIDNEY A. DIAMOND

Attesting Officer     Commissioner of Patents and Trademarks